United States Patent

[11] 3,591,077

[72] Inventors Ahdor H. Alton
Lake Zurich;
Michell I. Kohn, Wheeling, both of, Ill.
[21] Appl. No. 827,714
[22] Filed May 26, 1969
[45] Patented July 6, 1971
[73] Assignee Gulton Industries, Inc.
Metuchen, N.J.

[54] PROPORTIONING TEMPERATURE CONTROL APPARATUS
19 Claims, 21 Drawing Figs.

[52] U.S. Cl. ................................................. 236/69,
165/26, 219/502, 236/78, 307/265, 317/133.5
[51] Int. Cl. ...................................................... G05d 23/22,
G05d 11/28
[50] Field of Search .......................................... 236/78, 69,
1 C; 165/26; 219/499, 502, 494; 307/310, 265;
317/133.5, 124; 73/355

[56] References Cited
UNITED STATES PATENTS
3,240,428  3/1966  Umrath ........................ 236/78

Primary Examiner—William E. Wayner
Attorney—Wallenstein, Spangenberg, Hattis and Strampel ABSTRACT: A proportioning temperature control apparatus provides for a variable width temperature band over which proportional control is effected, and wherein variation of the bandwidth automatically varies the rate at which proportional control is effected at various points within the band, the rate decreasing with decreasing bandwidth. The variable bandwidth is effected most advantageously by means of a unique control circuit which utilizes a capacitor whose voltage is added or otherwise mixed with the output of a means for generating a progressively varying voltage as the temperature of the environment being controlled varies within the control band. A capacitor charge circuit selectively controls the application of a pair of variable DC voltages to the capacitor depending upon the presence or absence of heating or cooling signals in the output of the control apparatus. These DC voltages are selected to be near the voltage values to which the capacitor must be charged to effect the turn-on and turnoff of the heating or cooling producing signals involved. Variation of one or the other of the DC voltages referred to automatically varies the control bandwidth and the rate of control.

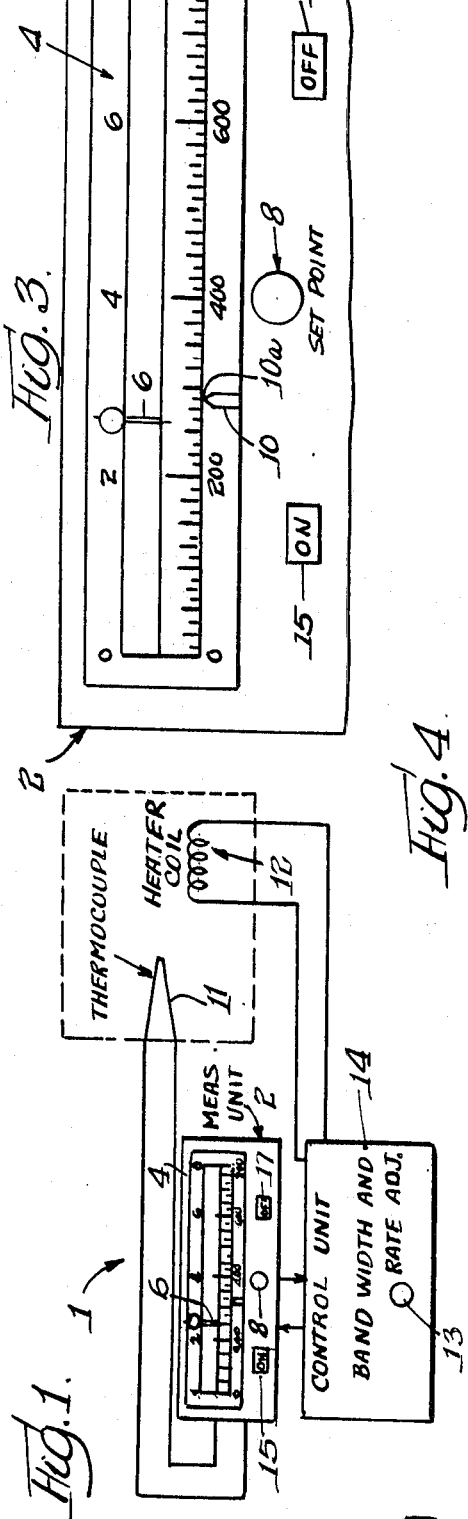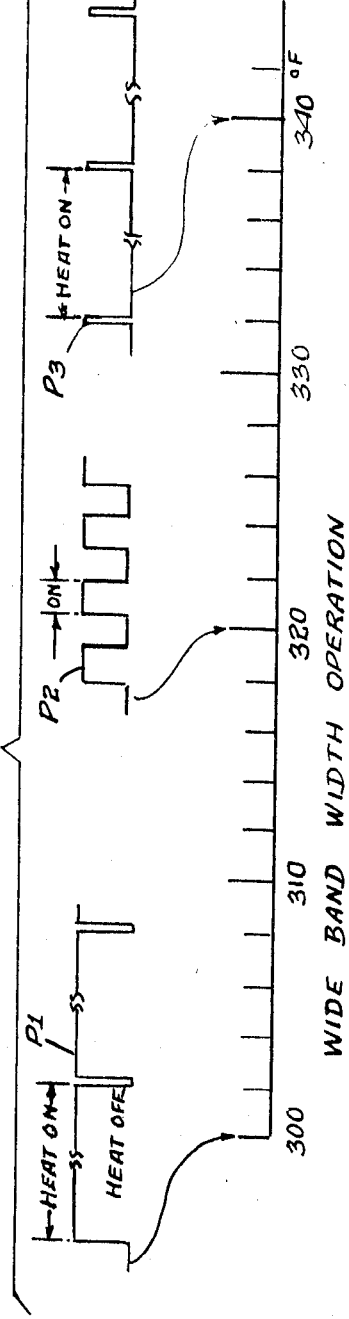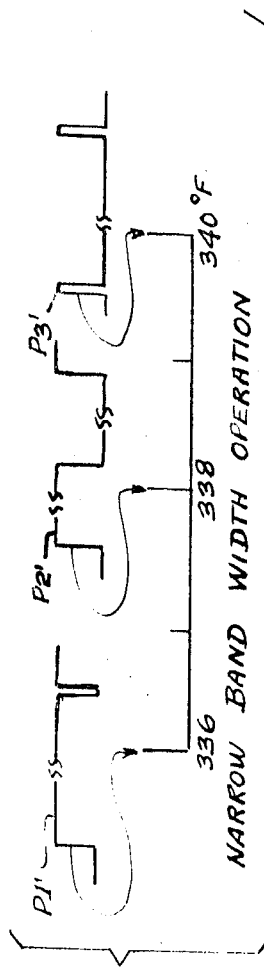

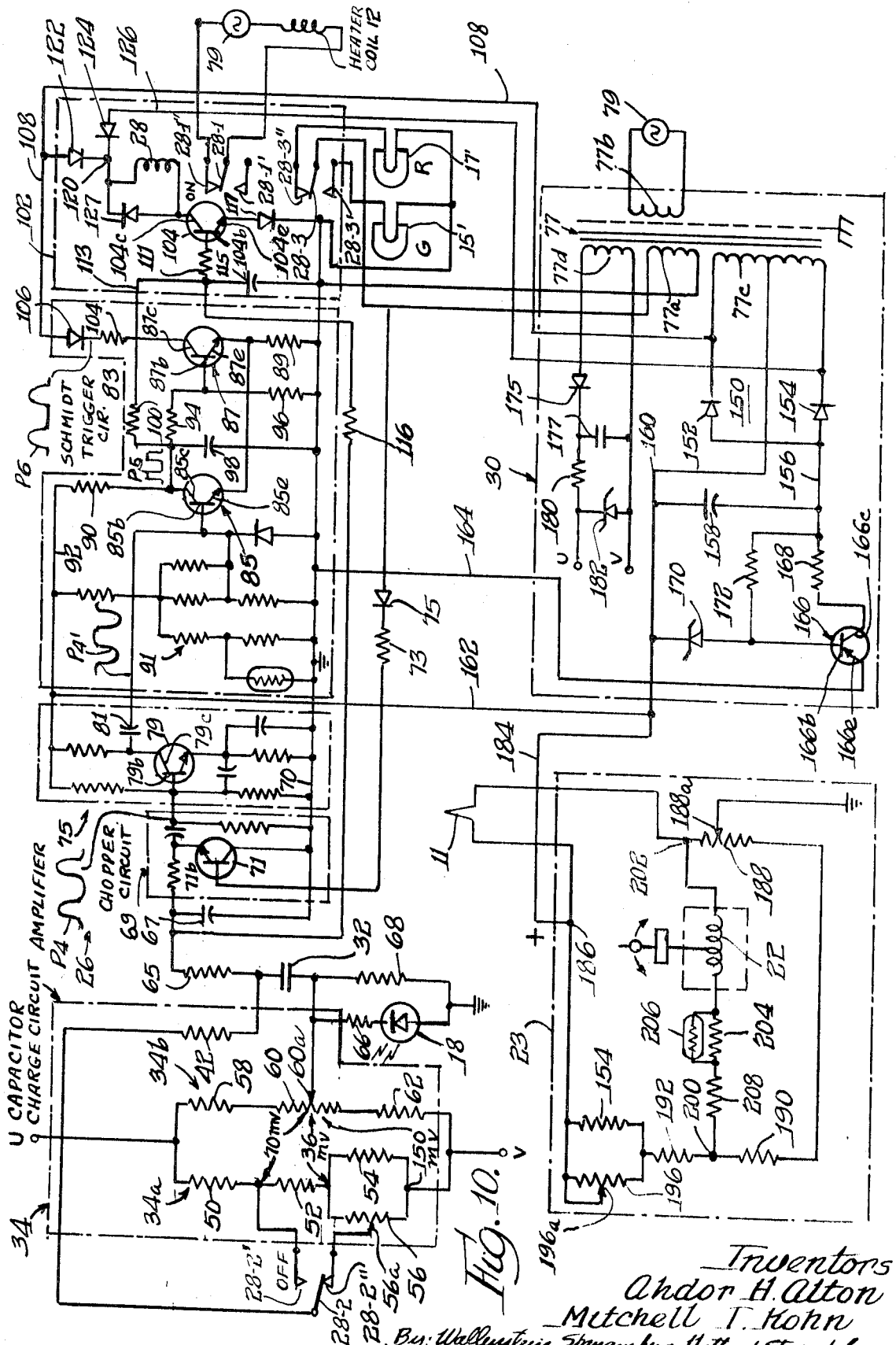

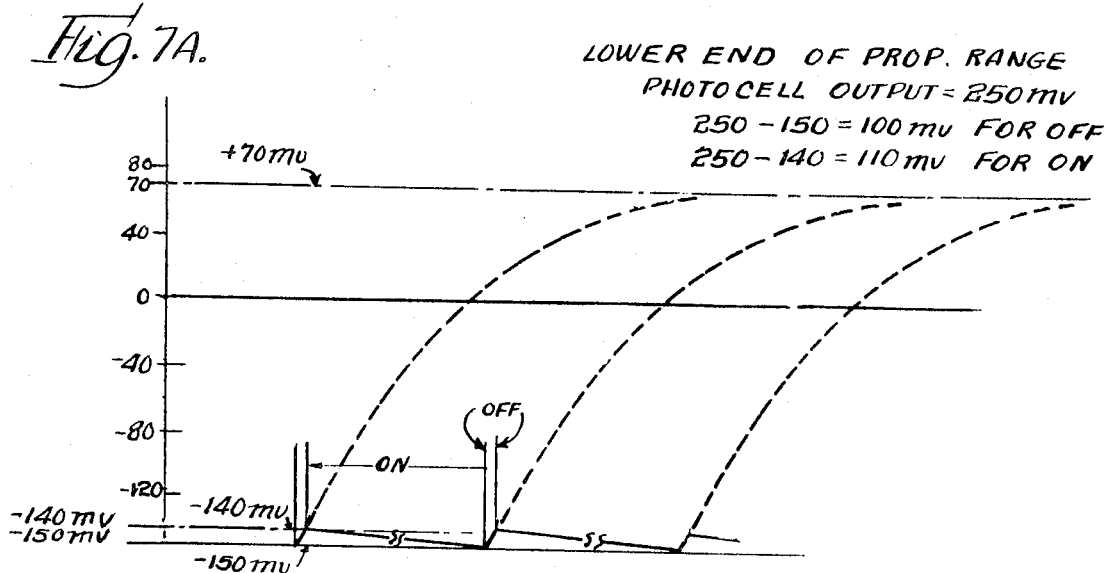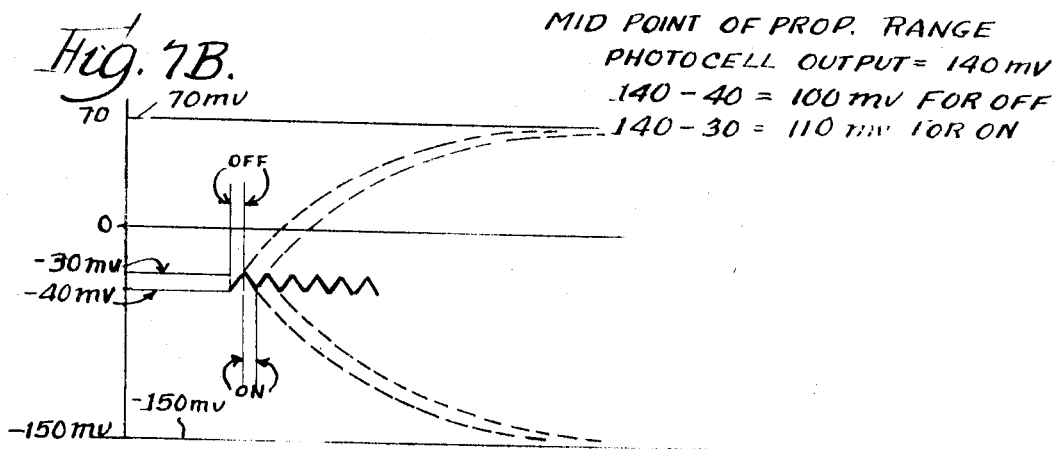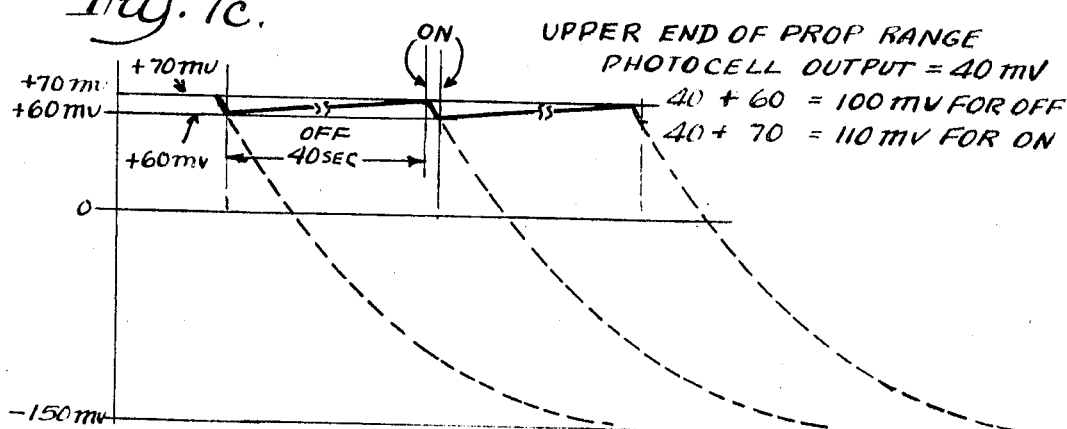

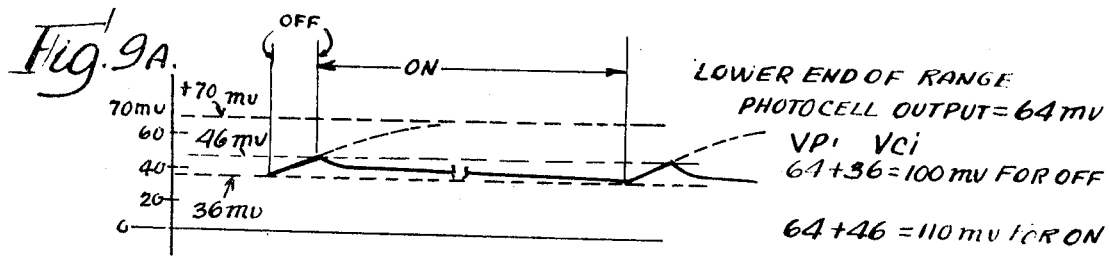
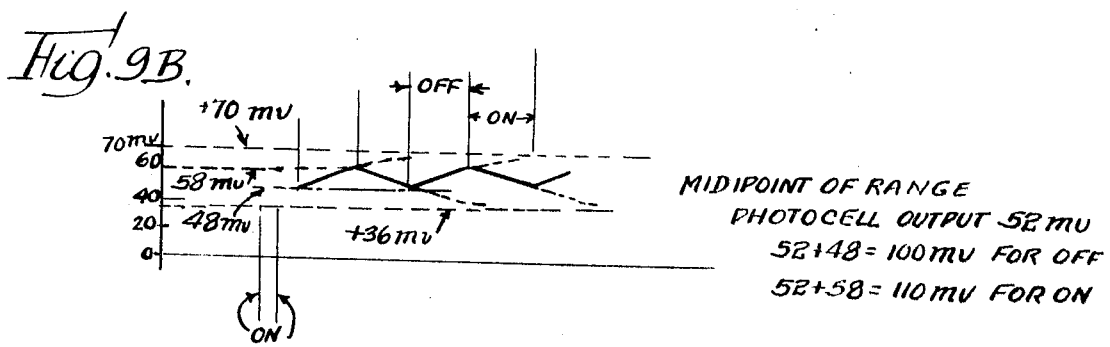
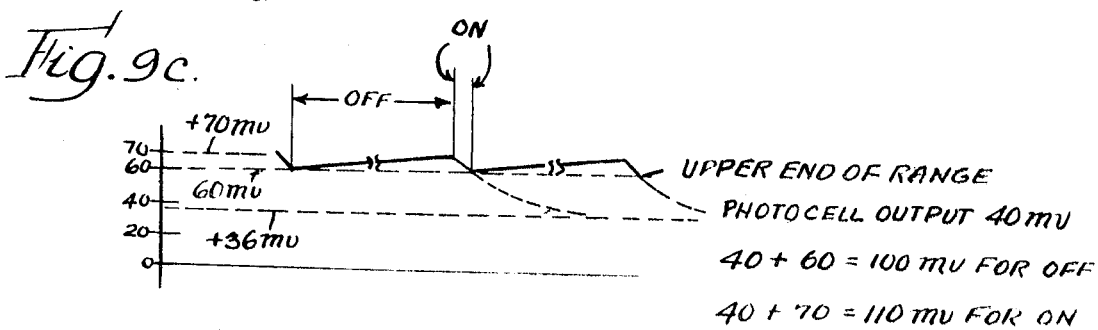
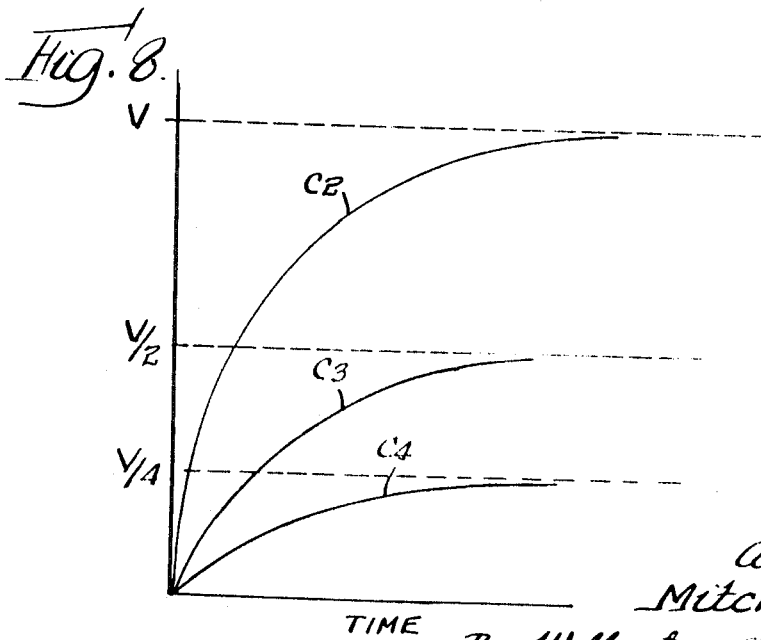

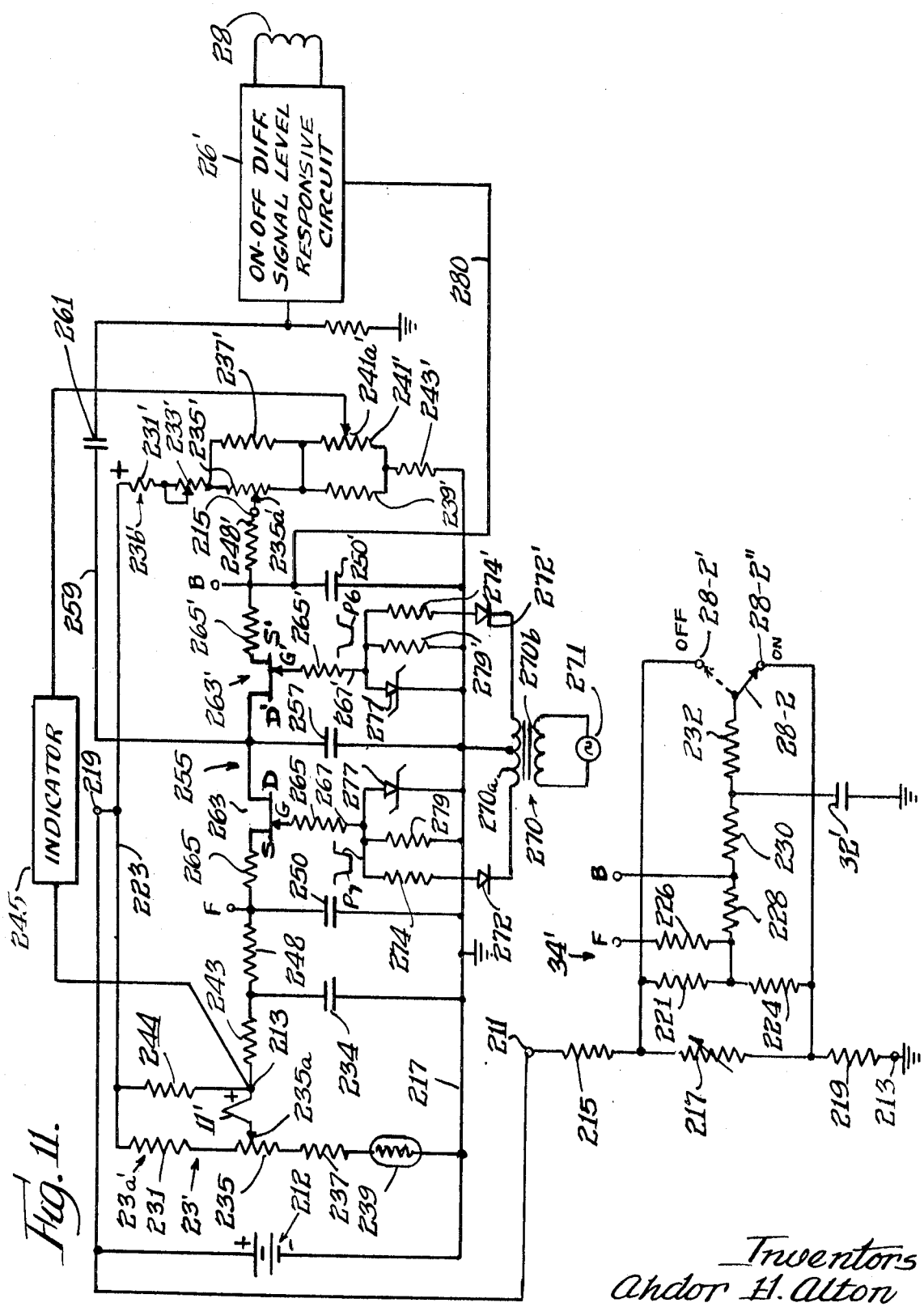

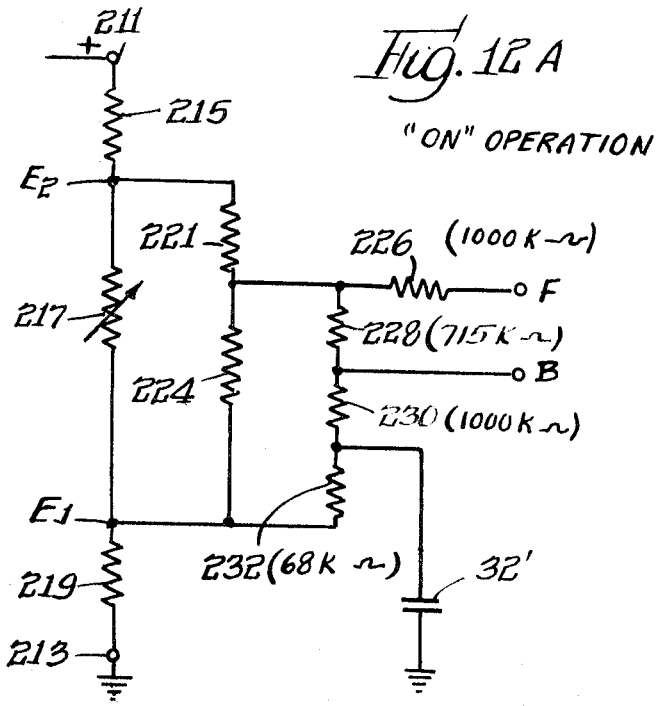
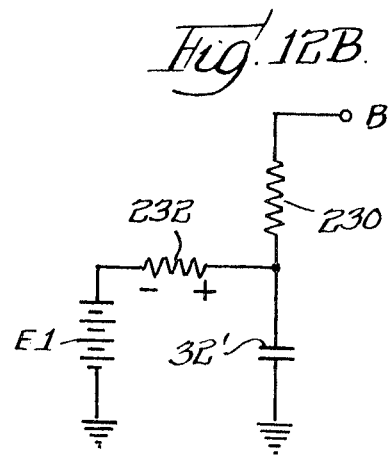
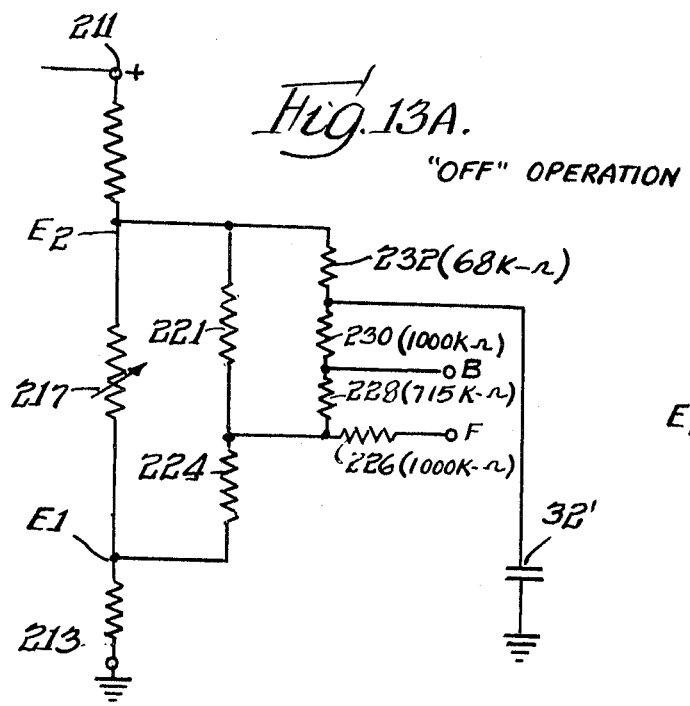
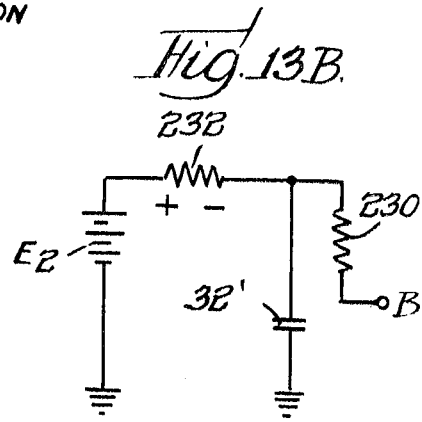

PATENTED JUL 6 1971

Inventors
Andor H. Alton
Mitchell T. Kohn
By: Wallenstein, Spangenberg, Hattis and Strampel

PROPORTIONING TEMPERATURE CONTROL APPARATUS

This invention relates to temperature control apparatus and more particularly to proportioning temperature control apparatus. It has application to systems which control temperature through heating or cooling the environment involved, although the particular exemplary application of the invention to be described will be a heating system.

Proportioning temperature control systems are desirable because, unlike on-off temperature control systems where the temperature of the environment being controlled oscillates between limits, the temperature of the controlled environment can be held perfectly constant after a short delay period when the system becomes stabilized. In the case where the ambient temperature of the environment is lower than the control temperature and the control temperature is reached by the energization of a heater coil or the like, as the ambient temperature remains below the lowest temperature of the band of temperatures over which proportional control is to be effected, the heating coil is generally energized continuously. When the lower limit of this temperature band is reached, proportional control is initiated whereupon the heating coil is cyclically energized and deenergized with the ratio of the power "on" (i.e., heat on) to the power "off" intervals each cycle being very large, the ratio progressively diminishing to approximately one as the temperature increases to the midpoint of the band and further diminishing to where the ratio of the power "on" to the power "off" intervals is very small when the temperature reaches the upper limit of the control band. For temperatures above the control band, the heater coil is substantially continuously deenergized. (Such a proportioning control system anticipates and corrects for thermal inertia by preventing control point overshoot on most installations, with the resultant quick stabilization of the temperature.)

The band of temperatures over which proportional control is obtained is sometimes made variable because the bandwidth for best temperature control varies with the particular environmental conditions involved. The user of the proportioning temperature control apparatus involved adjusts a setpoint control to select a given temperature, usually the temperature at the midpoint of the temperature control band involved, at or near the desired environmental temperature. However, the actual stabilized temperature which is obtained, although falling within the control band involved, generally differs somewhat from the setpoint temperature in the absence of an automatic offset eliminating means, the difference in these two temperatures being commonly referred to as temperature "offset" or "droop." A proportioning control system having a relatively wide control band naturally produces a much greater offset than a system adjusted for a relatively narrow control band. A narrow control band however, is disadvantageous where the environmental conditions vary rapidly or where it is desired to obtain temperature stabilization as quickly as possible.

The frequency at which the temperature control power is cyclically turned on and off has been found to be an important factor for effective proportional control. This has not been generally appreciated, with the result that it is generally the case that a given proportioning control system has only a limited number of applications where it can be most effectively applied. It has been discovered that, when proportional control is effected over a wide bandwidth, the frequency of interruption of the power "on" and power "off" signals should generally be relatively high and, when proportional control apparatus is effected over a relatively narrow bandwidth, the frequency of interruption of the power "on" and power "off" signals should be relatively low. Also, the frequency of the interruption rate of the power "on" and power "off" signals of a system adjusted to a given bandwidth should progressively vary from a minimum value where the temperature is at the extremes of the band to a maximum at the center portion of the band where rapid close control is needed. The operation of a wide bandwidth proportioning control system with a relatively low interruption rate at a given point within the band produces a control system where it is difficult frequently to stabilize the temperature. The operation of a narrow bandwidth proportioning control system with a relatively high interruption rate at a given point within the band frequently produces temperature drift.

Most, if not all prior proportioning temperature control systems do not provide for the ready variation of both bandwidth and rate and they are not designed with the appreciation of the advantageous relationship between bandwidth and frequency described above. Moreover, because of the nature of the proportioning control circuitry used, the temperature of the controlled environment indicated by the apparatus often varied with the ambient temperature (i.e., the cold junction of the thermocouple commonly used to sense the environmental temperature).

One of the aspects of the present invention is the provision of proportioning control apparatus with the provision of means for selectively varying the control bandwidth while automatically simultaneously varying the frequency of the power "on" and power "off" interruption rate so that the rate decreases with the control bandwidth.

Another aspect of the invention is the provision of proportioning temperature control apparatus with a simple, reliable circuit for controlling the interruption of the power "on" and power "off" signals and which is readily adjustable to vary both the control bandwidth and the interruption rate, most advantageously together, so that an increase in the bandwidth automatically increases the interruption rate. Also, unlike the prior proportioning control systems where the circuit used for proportional control made it difficult to provide compensation for cold junction or ambient temperature variation, the preferred forms of the invention separate electrically the temperature measuring circuit from the proportional control circuit so that cold junction compensation can be easily provided to provide a direct reading of temperature which is independent of ambient temperature conditions.

In the most advantageous form of the invention, the proportioning control circuit uses a simple capacitor charge circuit which develops a cyclic voltage across a capacitor which is added or mixed with the output of a means which generates a voltage which varies progressively with the environmental temperature within the control band. The capacitor charge circuit controls the application of a pair of variable DC voltages to the capacitor depending upon the presence or absence of heating or cooling signals in the output of the control apparatus. These DC voltages when respectively added to the output of said voltage generating means when the temperature of the environment being controlled is at the respective limits of the desired control band provide resultant voltages which are at or near voltage values which respectively effect the turn on and turnoff of heating or cooling producing signals. Variation of one or the other of the DC voltages referred to automatically varies the control bandwidth and the rate of control.

The above and other advantages and features of the invention will become apparent upon making reference to the specification to follow, the claims and the drawings wherein:

FIG. 1 is a simplified, schematic diagram of the basic components used in a heating application of the present invention;

FIG. 2 illustrates a temperature versus time curve provided by any proportioning control apparatus including that of the present invention;

FIG. 3 is an enlarged view of the measuring unit forming part of the apparatus shown in FIG. 1;

FIG. 4 illustrates the heating signals generated by the control unit forming part of the apparatus of FIG. 1 when the temperature of the control environment is at the extremes and midpoint of a relatively wide control band;

FIG. 5 is a view corresponding to FIG. 4 with the proportional control apparatus of FIG. 1 adjusted to operate over a relatively narrow control band;

FIG. 6 is a schematic diagram, partly in block form, illustrating the circuits of the measuring and control units shown in FIG. 1;

FIGS. 7A, 7B and 7C illustrate the voltage waveforms developed across the capacitor forming part of the circuitry shown in FIG. 6 when the environmental temperature is respectively at the low end, the midpoint and the upper end of the control band when the circuitry is adjusted to provide the widest control band;

FIG. 8 illustrates capacitor charge curves where a capacitor charges to different voltages;

FIGS. 9A, 9B and 9C shows the corresponding voltage waveforms developed across the capacitor in FIG. 6 when the circuitry is adjusted to provide the narrowest control band;

FIG. 10 illustrates an exemplary circuitry of the proportional control system illustrated in FIG. 6;

FIG. 11 is a circuit diagram of an alternative form of the invention which has a number of advantages over the circuit of FIG. 10;

FIG. 12A is a circuit diagram of the capacitor charge circuit forming part of the circuit of FIG. 11 when the heating or cooling signal control relay is energized;

FIG. 12B is a simplified circuit of FIG. 12A;

FIG. 13A is a circuit diagram of the capacitor charge circuit forming part of the circuit of FIG. 11 when the heating or cooling signal control relay is deenergized;

FIG. 13B is a simplified circuit of FIG. 13A;

Figures 14, 15:
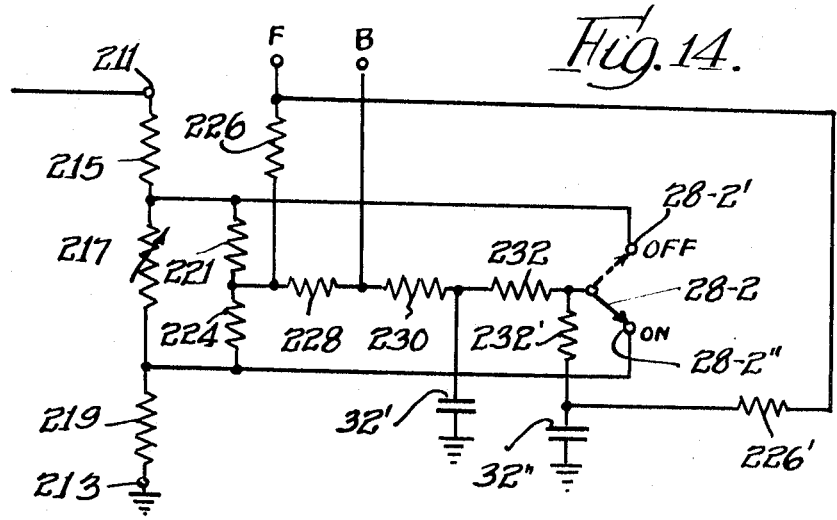
FIG. 14 is a modified capacitor charge circuit which provides for the automatic elimination of any offset between the set point temperature and the actual temperature of the environment.
FIGS. 15 a—e is a diagrammatic view illustrating the manner in which the circuit of FIG. 14 operates.

Referring now to FIG. 1, the proportioning control system shown therein and generally indicated by reference numeral 1 includes a measuring unit 2 which has, among other things, a temperature indicating scale 4 shown in enlarged form in FIG. 3 across which moves a temperature indicating pointer 6 which assumes a position on the scale 4 which indicates the temperature of the environment whose temperature is to be controlled. Also movable across the scale 4 by operation of a manually operable control knob 8 is a setpoint indicating member 10 whose tip is set opposite the number on the scale 4 indicating approximately the desired temperature for the environment being controlled. The temperature of the environment to be controlled may be detected by a suitable thermocouple 11 or other input means which is connected to a measuring circuit forming part of the measuring unit 2 which operates a galvanometer movement to which the index pointer 6 is attached.

Figures 2, 6:
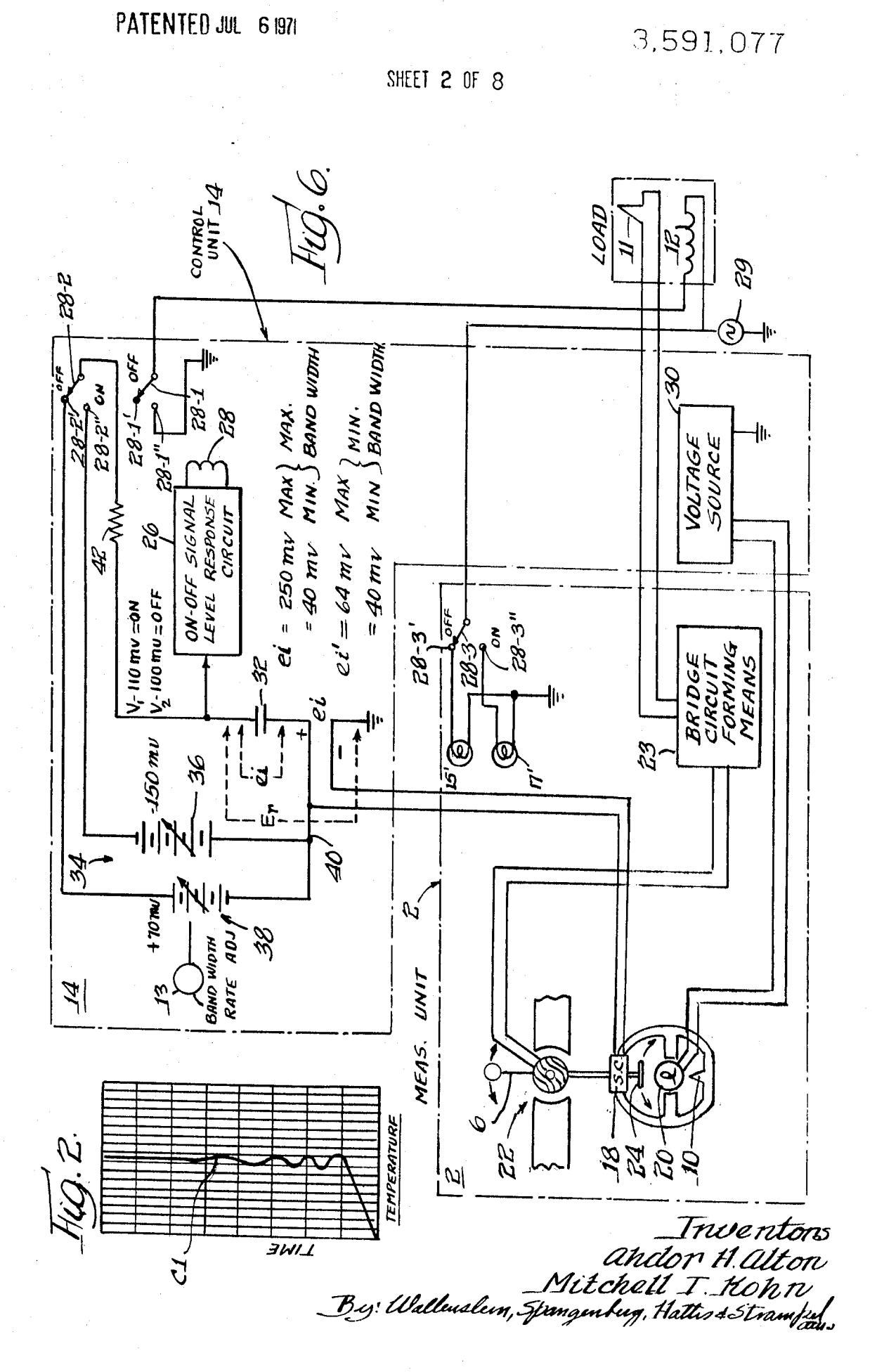

The temperature of the environment in which the thermocouple 11 is located is shown controlled by a heater coil 12 which, within the proportioning control range of the system, cyclically receives current pulsations cyclically applied thereto whose average value produces the desired temperature of the environment involved under control of a control unit 14. The control unit 14 receives a DC voltage from the measuring unit 2 which indicates whether or not the index pointer 6 is below or above the limits of the temperature band over which proportional control is effected or is within this control band. In the latter case, the amplitude of the voltage progressively varies as the index pointer 6 moves between the limits of the widest such control band over which the apparatus is adjustable. For temperature below the lowest temperature of this control band, the voltage fed to the control unit from the measuring unit may be a constant relatively high value and for temperatures above the upper limit of the control band involved this voltage may be a fixed relatively low value. Such a range of voltage variations may be readily provided, for example, by a light responsive element like a photocell or solar cell arrangement such as illustrated in FIG. 6. When the temperature of the environment to be controlled is below the lower limit of the control band involved, the control unit 14 feeds a continuous current to the heater coil 12. When the temperature of the environment reaches the low limit of the control band involved, the current fed to the heater coil will be cyclically interrupted for very short intervals to produce current pulses as indicated by current pulse waveform P1 in FIG. 4 illustrating the operation of the system for the widest control band. As indicated, the period of each cycle for the pulses P1 is relatively long (e.g. 40 seconds) with the interruption of the current pulses occurring for only a very small fraction of this period. As the temperature of the environment progressively increases from the lower limit of the control band involved, the ratio of the power "on" to the power "off" interval of each cycle progressively decreases as the interruption rate progressively increases to a point where this ratio is 1 at approximately the midpoint of the control band involved as indicated by the current pulses P2 in FIG. 4. As an example, the period between successive current interruptions may be approximately 12 seconds with the power "on" and power "off" intervals approximately equal when the period of each cycle is 40 seconds under the aforesaid conditions illustrated in FIG. 4. As the temperature of the environment further progressively increases toward the end of the control band involved, the ratio of the power "on" to the power "off" intervals of each cycle progressively decreases and the current interruption rate progressively decreases. At the upper end of the control band illustrated in FIG. 4, very short current pulses P3 are fed to the heater coil with the period between current pulsations being relatively long (e.g. 40 seconds).

As shown in FIG. 6, the setpoint indicator member 10 may be part of a moving frame which carries a light responsive element 18 on one portion of the frame and a light source 20 on another portion of the frame so that light is directed to the light responsive element 18. The temperature indicating pointer 6 attached to a galvanometer movement 22 which carries a masking element 24 which, at the low temperature end of the widest control band referred to, begins to move into the path of the light beam passing from the light source 20 to the light responsive element 18. The masking element 24 progressively blocks off this light beam in progressively increasing degrees as the temperature indicating pointer 6 moves across the widest control band. At the upper temperature limit of the control band, the masking element 24 substantially completely blocks the light beam. The solar cell 18 may act as a variable impedance element as in the case of a photocell or voltage generating element to provide a variable DC output in accordance with the degree to which the light beam is intercepted by the masking element 24.

In accordance with one of the aspects of the present invention, the width of the temperature control band is electrically varied by means of a single control member 13 (FIG. 1) in the control unit 14. Thus, in one extreme position of the bandwidth control member 13, the band of temperature over which proportional control is obtained may be, for example, 4° Fahrenheit, and, as this control member is progressively moved to its other extreme position, the control band varies, for example, to a maximum of 40° Fahrenheit. Also, as the bandwidth control member 13 is adjusted, in a manner soon to be explained, the interruption rate of the heating signal for temperatures within the control band involved is most advantageously varied so that the interruption rate at a particular location of the control band progressively decreases with decreased bandwidth.

FIG. 5 illustrates an example of the effect of the adjustment of the bandwidth control member 13 on the current pulsations fed by the control unit 14 to the heater coil 12 when the bandwidth control member 13 is adjusted to provide an exemplary narrow control band. As illustrated, the narrow width control band is only 4° Fahrenheit. When the temperature of the environment reaches the lower end of this control band, current pulses P1' are fed to the heater coil at a lower frequency than the current pulses P1 for the widest bandwidth operation, with the interval of each current pulsation occupying substantially the entire period except for a small interruption interval as indicated. The period between successive current interruptions then may, for example, be 45 seconds. As the temperature of the environment progressively increases to the midpoint of the band, the decrease in the period and increase in the interruption rate of current pulsations P2' relative to that during the widest band operation becomes less pronounced. For example, the period between current pulsations P2' may be 20 seconds rather than 12 seconds for the widest band operation. The power "on" and power "off" intervals at the midpoint of the narrowest control band are approximately equal as in the case of the wider band operation. When the temperature of the environment reaches the upper limit of the narrowest control band, as illustrated, the current pulses P3' are very short so as to occupy only a small portion of each cycle. The exemplary period may then be approximately 45 seconds.

In the proportioning control system as illustrated, the variation of the temperature of the environment with time is illustrated by the curve C1 in FIG. 2 where, after a few cycles of temperature oscillation, the system will end up with a ratio of power "on" to power "off" each cycle being fixed to provide a constant temperature. As above indicated, this constant temperature is generally different from the initial position of the setpoint indicating member 10. This temperature "droop" or "offset" will be naturally greater for a wide control band setting than a narrow control band setting of the system. Such temperature "offset" can be readily corrected by manually adjusting the setpoint control member 10 to compensate for this temperature "offset."

The measuring unit 2 may be provided with a pair of colored light transmitting panels 15 and 17 (FIG. 3) behind which lamps may be mounted. When the heater coil 12 is not receiving any current, one of the light panels 15 which may be a green colored glass will be lighted and when the heater coil 12 is receiving current the other light panel 17 which may be colored red will be lighted.

Refer now to FIG. 6 which indicates the most advantageous form of the invention for controlling in a simple and reliable manner the width of the control band along with the rate of control. The output of the solar cell 18 in FIG. 6 represents a signal input component $ei$ fed to an on-off signal level responsive circuit 26. In addition to the signal input component $ei$, the resultant voltage $Er$ fed to the circuit 26 includes a second signal input component $ei'$ which is a voltage developed across a capacitor 32 shown connected in series with the output of the solar cell 18.

The on-off signal level responsive circuit 26 controls the energization of a relay 28 having a series of movable contacts 28-1, 28-2, and 28-3 which make contact with stationary "off" contacts 28-1', 28-2' and 28-3' when the relay 28 is deenergized. When the resultant input voltage $Er$ coupled to the on-off signal level responsive circuit 26 reaches a voltage level VI (e.g. 110 millivolts), relay 28 will become energized. The circuit 26 will continue to keep relay 28 energized until the resultant input voltage $Er$ thereto changes direction and reaches a voltage level V2 (e.g. 100 millivolts) when the relay 28 becomes deenergized. The heater coil 12 is shown connected between the movable contact 28-1 and an AC voltage source 29 to complete an energization circuit to the heater coil 12 when grounded stationary contact 28-1" is engaged by the movable contact 28-1 when relay 28 is energized.

A capacitor charge circuit 34 generally indicated by reference numeral 34 is provided which, for any given adjustment of the bandwidth and rate control member 13, provides a different pair of DC capacitor charging voltages at the output of voltage sources 36 and 38. For sake of illustration, it will be assumed that for the widest control bandwidth, the solar cell 18 will provide a 250 millivolt output when the solar cell 18 is unobstructed, that is for environment temperatures below the lowest limit of the control band involved, and will provide an output of 40 millivolts when the solar cell is substantially completely obstructed by the masking element 24 due to ambient light conditions or other reasons. In such case, it is apparent that for the resultant input voltage $Er$ to the on-off signal level responsive circuit 26 to reach a level V1, 110 millivolts, to operate the circuit 26 to an "on" condition, where the relay 28 is energized when the environmental temperature is at the lowest end of the control band, the signal input component $ei'$ developed across the capacitor 32 must be minus 140 millivolts (i.e. 250−140 millivolts equals 110 millivolts), and for the resultant input voltage $Er$ to reach a level V2, 100 millivolts, to operate the circuit 26 to an "off" condition, where relay 28 is deenergized when the environmental temperature is at the lowest end of the control band, the voltage $ei'$ developed across the capacitor 32 must be minus 150 mv. (i.e. 250−150 millivolts equals 100 millivolts). For best control, the difference between the "on" and "off" voltage levels V1 and V2 is selected to be a fraction of the difference in the DC output voltages of the DC voltage sources 36 and 38.

When the environmental temperature is at the upper end of the widest control band involved, it is assumed that the output of the solar cell 18 will be 40 millivolts. Under these circumstances, for the resultant input voltage $Er$ to the on-off signal responsive circuit 26 to reach 110 millivolts to effect energization of the relay 28, the voltage across the capacitor 32 must be plus 70 mv. (i.e. 40+70 millivolts equals 100 millivolts), and for the resultant voltage $Er$ to reach 100 millivolts to effect deenergization of the relay 28, the voltage across the capacitor 32 must drop to plus 60 millivolts. For reasons to be explained, to provide the proper signals to the on-off signal responsive circuit 26 to operate the system as illustrated in FIG. 4, the magnitude V3 of the output voltage of one of the voltage sources 36 is selected so it is approximately equal to the voltage (e.g. −150 millivolts) to which the capacitor 32 must be charged to operate the on-off signal responsive circuit 26 to its "off" state when the environmental temperature is at the low end of the control band. Also, the magnitude V4 of the output of the other voltage source 38 is selected so that it is at or near the voltage (e.g. +70 millivolts) to which the capacitor 32 must be charged to operate the on-off signal of the responsive circuit 26 to its "on" condition when the environmental temperature is at the upper end of the control band involved.

The voltage sources 36 and 38 are selectively connected to the capacitor 32 depending upon whether the relay 28 is energized or deenergized. To this end, as illustrated, the relatively negative terminal of the plus 70 millivolt voltage source 38 and the relatively positive terminal of the negative 150 millivolt voltage source 36 are connected by a conductor 40 to the plate of capacitor 32 remote from the circuit 26, and the relatively positive terminal of voltage source 38 and the relatively negative terminal of the voltage source 36 are respectively connected to stationary contacts 28-2' and 28-2" associated with the movable contact 28-2 of the relay 28. When the relay 28 is energized to effect feeding of a heating current to the heater coil 12, the movable contact 28-2 will make connection with the stationary contact 28-2" to connect the negative terminal of the voltage source 36 to a capacitor charging resistor 42 in turn connected to the plate of the capacitor 32 nearest the circuit 26. Thus, when the relay 28 is energized to effect a heating operation, the voltage source 36 is connected to the capacitor 32 to cause it to charge through resistor 42 to a voltage which causes the circuit 26 to deenergize the relay. Similarly, when relay 28 becomes deenergized, the movable contact 28-2 will make contact with the contact 28-2' to connect the voltage source 38 to the capacitor 32 to cause it to charge through resistor 42 to a voltage which causes the circuit 26 to energize the relay.

The manner in which the capacitor 32 charges to the two voltages involved to effect the operation of the proportioning control system shown in FIG. 4 is illustrated in FIGS. 7A, 7B and 7C to which reference should now be made. FIG. 7A illustrates the condition of the proportioning control system when the environmental temperature is at the lower end of the control band shown in FIG. 4, when the capacitor is connected to the plus 70 millivolt voltage source 38 during the "off" condition of the circuit 26 when the capacitor charges from minus 150 millivolts to plus 70 millivolts. Since, in the example of the invention being described, the voltage of the capacitor 32 never varies more than 10 millivolts, in driving the circuit 26 to its "on" condition the voltage across capacitor 32 will arrive very quickly to minus 140 millivolts to terminate the "off" condition of the circuit 26 because the capacitor is charging to a voltage substantially different (i.e. plus 70 mv.) from its initially minus 150 millivolt condition. As illustrated in FIG. 8, when a capacitor charges to voltages V, V/2 and V/4 respectively of diminishing magnitude, the charging waveforms C2, C3 and C4 are of progressively diminishing steepness. Thus, when the circuit 26 is in its "on" condition and the minus 150 millivolt voltage source 36 is then connected to the capacitor 32, the capacitor charges very slowly to minus 150 millivolts because the capacitor is then charging to a voltage which is near its initially charged condition so it takes a relatively long time for the capacitor to reach the minus 150 millivolt condition. This means that circuit 26 will have a relatively long "on" condition and a relatively short "off" condition, which is the desirable condition for the situation where the environmental temperature is near the low end of the control band.

Referring now to FIG. 7C which illustrates the condition when the environmental temperature is near the upper end of the control band, it will be seen that the capacitor will charge and discharge between plus 60 and 70 millivolts to operate the circuit 26 between its "off" and "on" conditions, and here the capacitor charges slowly from plus 60 to 70 millivolts during the "off" condition of the circuit 26 since its initial voltage of 60 millivolts is close to the 70 millivolts to which it is charging, so it will take a relatively long time for the capacitor 32 to switch the circuit 26 from its "off" to its "on" condition and so the circuit 26 operates for relatively long intervals in its "off" condition. When the capacitor 32 is discharging from plus 70 millivolts to plus 60 millivolts during the "on" condition of the circuit 26, the capacitor conversely reaches 60 millivolts rapidly since the capacitor is then charging toward minus 150 millivolts, a voltage substantially different from its initial voltage. Therefore, the circuit 26 will be operated in its "on" condition for very short intervals.

FIG. 7B illustrates the voltage waveform across the capacitor 32 when the environmental temperature is at the midpoint of the control band. As indicated in FIG. 7B, the capacitor 32 will then charge between minus 30 and minus 40 millivolts which is roughly midway between the voltage levels V3 and V4 (minus 150 millivolts and plus 70 millivolts), so capacitor 32 charges and discharges between minus 30 and minus 40 millivolts at approximately the same modest rates, resulting in roughly equal "on" and "off" times of the circuit. Also, the period between successive cycles of the control signals is small (i.e. the proportioning rate is relatively high) in comparison to the period required for each control cycle when the environmental temperature is at the extremes of the control band involved.

Thus, it is apparent that when the capacitor 32 charges and discharges between voltages the difference of which is a small fraction of the voltage levels V3 and V4 between which the capacitor charge curves extend, when the capacitor voltages are near one of the voltage levels V3 (i.e. minus 150 millivolts in the example described), the capacitor has a relatively small discharge (or charge) period during which the circuit 26 is in its "off" condition and a relatively long charge (or discharge) interval during which the circuit 26 is operated in its "on" condition. Similarly, when the voltages on the capacitor are near the other voltage levels V4, the capacitor 32 has a relatively short discharge (or charge) period during which the circuit 26 is operated in its "on" condition and a relatively long charge (or discharge) period during which circuit 26 will be operated in its "off" condition.

FIGS. 9A, 9B and 9C represent the voltage waveforms across the capacitor 32 when the proportioning control system is adjusted to provide the narrowest bandwidth operation shown in FIG. 5. To accomplish this result, it is necessary to vary at least one of the voltage sources 36 and 38 so that it has a voltage much closer to the voltage of the other voltage source. For example, if the voltage source 36 changed from minus 150 millivolts to plus 36 millivolts, the control bandwidth is reduced to the point where the lower temperature limit in the band is that temperature where the solar cell output (reduced from its previous value) for such temperature plus the 36 millivolts equals the 100 millivolts needed to turn the circuit 26 to its "off" condition. Thus, in the exemplary form of the invention being described, the solar cell 18 will produce a voltage of 64 millivolts when the temperature indicating pointer 6 is at 336 degrees Fahrenheit. The adjustment of the voltage source 36 to such a voltage of 36 millivolts will then automatically reduce the control rate because the capacitor 32 will be charging toward voltages in the extreme which are much closer to the voltages on the capacitor to start with so it will take the capacitor 32 a much longer time to reach the voltage limits thereon involved.

FIG. 6 also illustrates the energization circuit for a green lamp 15' and a red lamp 17' which are respectively mounted behind the light panels 15 and 17 of the measuring unit 2 (see FIG. 3). Accordingly, the green lamp 15' has a terminal connected to the stationary contact 28-3' which is engaged by the movable contact 28-3 when the relay 28 is deenergized. The red lamp 17' has a terminal extending to the stationary contact 28-3" engaged by the movable contact 28-3 when the relay 28 is energized. The other terminals of the lamps 15 and 17 are connected to the source of AC voltage 29. Also illustrated in FIG. 6 is that the galvanometer movement 22 and the thermocouple 11 are associated with a bridge circuit 23 which operates the galvanometer movement 22 so the temperature indicating pointer indicates the proper temperature on the measuring unit scale 4.

Refer now more particularly to FIG. 10 which shows the preferred circuitry for the box diagram of FIG. 6. As shown in FIG. 10, the capacitor charge circuit 34 is a bridge circuit which supplies the voltages V3 and V4 to the capacitor 32 in accordance with the energization or deenergization of the relay 28 controlling the flow of power to the heater coil 12. The DC input to the bridge circuit is at terminals U and V, terminal U being positive relative to terminal V. Extending in parallel between the input terminals U and V are bridge circuit-forming branches 34a and 34b. Bridge circuit-forming branch 34a as illustrated includes in series circuit relationship resistors 50 and 52 and a parallel connection of a resistor 54 and a potentiometer 56. The bridge circuit-forming branch 34b includes a resistor 58 in series with a potentiometer 60 and a resistor 62. The output of the bridge circuit is taken between wiper 60a of the potentiometer 60 and the movable contact 28-2 associated with bridge circuit-forming branch 34a. The wiper 56a extends to the aforementioned stationary "on" contact 28-2" contacted by the movable contact 28-2 of the relay 28 when relay 28 is energized. The juncture between resistors 50 and 52 in the bridge circuit branch 34a extends to the stationary "off" contact 28-2' contact by the movable contact 28-2 of the relay 28 when the relay 28 is deenergized. It should thus be apparent that when the movable contact 28-2 engages the stationary "off" contact 28-2' the movable contact 28-2 has a relatively high positive potential relative to bridge input terminal V and when the movable contact 28-2 engages the stationary "on" contact 28-2" the voltage on the movable contact 28-2 relative to terminal V will vary between zero and a small positive voltage as the wiper moves between the bottom and upper ends of the potentiometer 56.

The movable contact 28-2 is connected through the previously mentioned capacitor charging resistor 42 to the terminal of the capacitor 32 nearest the input to the on-off signal level responsive circuit 26. The wiper 60a of the potentiometer 60 in the bridge branch 34b is connected to the opposite terminal of the capacitor 32. The relative values of the resistors in the bridge circuit branch 34a are so selected that when the movable contact 28-2 engages the stationary "off" contact 28-2', the movable contact 28–2 will be positive with respect to the wiper 60a of the potentiometer 60 when the relay 28 is deenergized. The capacitor 32 and resistor 42 are thus connected between the output of the capacitor charging bridge circuit, namely between movable contact 28–2 and wiper 60a. When the wiper 56a of the potentiometer 56 is at the top of the potentiometer as viewed in FIG. 10 and the relay 28 is energized so the movable contact 28–2 engages the stationary "on" contact 28–2", as indicated the voltage of the movable contact 28–2 will be plus 36 millivolts with respect to the voltage on the wiper 60a. This represents the narrowest bandwidth condition of the proportioning control apparatus illustrated in FIG. 10. When the wiper 56a is at the bottom end of the potentiometer 56 when the relay is energized so the movable contact 28–2 engages the stationary "on" contact 28–2", the voltage of the movable contact 28–2 will be minus 150 mvs. With respect to the voltage on the wiper 60a. This represents the widest bandwidth condition of the proportioning control apparatus illustrated.

The capacitor 32 shown in FIG. 10 is coupled through a resistor 65 to one of the terminals of a capacitor 67 whose opposite terminal is connected to a grounded line 70. The time constant of the charge circuit of the capacitor 67 is such that the capacitor 67 will have a voltage developed there across which follows the sum of the voltage developed across the capacitor 32 and the output of the solar cell 18 (or the circuit thereof which, as illustrated, includes a series resistor 66 and a shunt resistor 68). The output of the capacitor 67 is fed to a more or less conventional shunt type chopper circuit generally indicated by reference numeral 69. The chopper circuit includes a transistor 71 which is alternately rendered conductive and nonconductive by the connection of its base electrode 71b through a resistor 73 and a rectifier 75 to the secondary winding 77a of a transformer 77 whose primary winding 77b is connected to a source 78 of 60 cycles per second AC voltage. Rectifier 75 couples half-wave rectified pulses from the transformer secondary winding 77a so the input to the chopper circuit 69 is effectively chopped at a 60 cycle per second rate where it can be readily amplified in an amplifier indicated by reference numeral 76. The output of the chopper circuit 69 therefore comprises a series of positive pulses P4 the amplitude of which corresponds with the increasing and decreasing portion of a waveform representing the sum of the output of the solar cell 18 and the capacitor 32.

The output of the chopper circuit 69 is fed to the base electrode 79b of a NPN transistor 79. This transistor forms with the associated circuit elements a class A amplifier having negative going pulses P4' in the output thereof taken at the collector electrode 79c which is coupled through a capacitor 81 to the input to a Schmidt trigger circuit 83. The Schmidt trigger circuit shown in FIG. 10 trigger a unique Schmidt trigger circuit which, unlike conventional Schmidt trigger circuits, has at least one of the portions thereof energized from a rectified source of alternating current to produce a pulsating energizing current therefor.

The Schmidt trigger circuit comprises a pair of NPN transistors 85 and 87 having respective emitter electrodes 85e and 87e connected through a common feedback resistor 89 to the ground line 70. The collector electrode 85c of the transistor 85 is coupled through a resistor 90 to a positive bus 92 which also feeds a biasing network 91 for the transistor 85 which normally biases the transistor to a fully conductive state. The base electrode 85b of transistor 85 is connected to the capacitor 81. The resultant flow of current through the common feedback resistor 89 will normally develop a sufficiently high positive voltage to keep the transistor 87 relatively nonconductive. When the input voltage fed to the chopper circuit 69 reaches 110 millivolts, the resultant negative going portion of the chopped signal pulses P4' developed at the output of the transistor 79 will drop the voltage at the base electrode 85b to a level which will drive the transistor 85 into a nonconductive state which, if the other transistor 87 is able to conduct, will form therewith a Schmidt trigger circuit wherein, through the feedback action of resistor 89 and a resistor 94 connected between the collector electrode 85c of transistor 85 and the base electrode 87b of transistor 87, reverses the conductive states of transistors 85 and 87 almost instantaneously so a sharp pulse P5 appears at the collector 85c of transistor 85. This pulse persists until the instantaneous value of the signal pulse P4' involved drops to a lower level than that which triggered the circuit. This represents the usual hysteresis action of a Schmidt trigger circuit. The relay 28 and/or the circuit controlling the same to be described has a delay which will not result in the energization of the relay 28 until a large number of pulses appear on the collector electrode 85c so that the negative going pulses P4' fed to the transistor 85 will build up in amplitude after the first pulse P4' triggers the transistor 85 into its conductive state until relay 28 operates. Transistor 85 is repeatedly driven into conduction by each pulse P4' during the "on" condition of operation of the signal level responsive circuit 26 until the input signal from the capacitor charge circuit 34 drops the resultant voltage Er to 100 millivolts in a manner to be explained.

As is well known, a Schmidt trigger circuit has a substantial hysteresis characteristic so that a voltage which triggers the same into one state of conduction must reverse direction and reach a substantially different level before the trigger circuit reverses its conductive state. The transistor 87 which is normally in a relatively nonconductive state, is energized by positive half-wave rectified 60 cycle per second voltage pulses P6 rather than a constant amplitude DC voltage as in the case of conventional Schmidt trigger circuits. To this end, the collector electrode 87c of the transistor 87 is coupled through a resistor 103 and a rectifier 106 to a line 108 extending to a center-tapped secondary winding 77c of the transformer 77. The phase of the positive half-wave rectified pulses P6 fed to the transistor 87 is the same as the half-wave rectified pulses P4 fed to the base of the chopper circuit transistor 71 so out of phase repetitive or cyclic interference pulses will not operate the Schmidt trigger circuit. After the initial triggering of the Schmidt trigger circuit in the manner described above, the amplitude of the negative going pulses fed by the capacitor 81 to the base electrode 85b of the transistor 85 is reduced in amplitude to a level caused by the drop in the input voltage to the circuit 26 to the aforementioned value of 100 millivolts. The point is reached where the bias provided on the base electrode 85b by the biasing network 91 once again establishes a voltage condition which causes the transistor 85 to become continuously relatively highly conductive again (the chopper signals will cause the switching off of the Schmidt trigger circuit between the chopper pulses even when such pulses trigger the circuit).

The aforesaid resistor 94 forms with a resistor 96 coupled between the base electrode 87b of the transistor 87 and the ground line 70 a voltage divider. A filtering capacitor 98 is coupled between the collector electrode 85e of the transistor 85 and the ground line 70. The voltage on the capacitor 98 is coupled through the resistor 100 to the input of a relay control circuit 102 including a transistor 104 normally in a relatively nonconductive state. When the voltage across the capacitor 98 is above a given threshold level, the transistor 104 becomes sufficiently conductive to energize the relay 28 connected in the load circuit of the transistor 104.

The base electrode 104b of a transistor 104 is connected by a resistor 111 to a conductor 113 leading to the coupling resistor 100. A noise filtering bypass capacitor 115 is coupled between the conductor 113 and the ground line 70. A rectifier 117 is connected between the emitter electrode 104e of the transistor 104 and the ground line 70. The relay 28 is connected between the collector electrode 104c of the transistor 104 and a point 120 to which is coupled a full wave rectified AC voltage. Accordingly, a rectifier 122 is connected between the point 120 and the aforementioned conductor 108 extending to one end of the center-tapped secondary winding 77c. The point 120 is also coupled by a rectifier 124 to a conductor 126 extending to the other end of the secondary winding 77c.

A reverse voltage preventing rectifier 127 to protect transistor 104 from high voltages induced in the relay 28 is connected in parallel with the relay when the voltage input to the chopper circuit 69 rises to 110 millivolts in the example of the invention being described, the voltage on the capacitor 115 is sufficiently high to raise the current flow in transistor 104 to a degree where the magnitude of the current flowing through the relay 28 will energize the same.

To provide a highly stabilized overall circuit hysteresis which will effect turnoff of the circuit 26 at the 100 millivolt input described, combined with the very small hysteresis Schmidt trigger circuit is a positive feedback brand extending between the input point to the relay control amplifier 102 at the ungrounded end of a grounded capacitor 115 connected through resistor 111 and conductor 113 to resistor 100 and the input to the chopper circuit 69. The feedback branch includes a relatively large resistor 116 connected to the ungrounded plate of the capacitor 67 at the input of the chopper circuit 69. This feedback branch, among other things, increases the positive voltage on the capacitor 67 so that once the circuit 26 is triggered to its "on" condition, an artificially increased negative going signal appears across the input of the Schmidt trigger circuit so that the relay 28 does not become deenergized until the amplitude of the signal input from the capacitor charge circuit 34 and solar cell drops to the exemplary 100 millivolt level in other words, this feedback branch provides an increased difference in the voltage necessary to operate the on-off signal responsive circuit 26 between its "on" and "off" than would be the case without this branch circuit. In effect, therefore, it is the feedback branch which provides the differential signal levels which operates the Schmidt trigger circuit between its "on" and "off" conditions (the "on" condition thereof meaning that the pulses P4' are effective in triggering the transistor 85 of the Schmidt trigger circuit each cycle to a relatively nonconductive state). In effect, during the alternate half-cycles when transistor 87 is not receiving any energizing voltage, transistor 85 and the associated rectifier elements act like an ordinary amplifier and, when transistor 87 receives the energizing pulses P6, the transistors 85 and 87 act as a Schmidt trigger circuit. The pulsing of transistor 87 results in a greatly reduced hysteresis for the trigger circuit and enables the circuit to act as a phase detector.

The power source 30 may be a more or less conventional power source. As illustrated, it includes a full wave rectifier circuit 150 comprising rectifiers 152 and 154 coupled between the opposite ends of the aforementioned secondary windings 77c. The anode electrodes of the rectifiers 152 and 154 are coupled to a common conductor 156 leading to one of the plates of a filter capacitor 158 whose opposite plate is connected to a conductor 160 extending to the center tap point of the secondary winding 77c. The conductor 166 extending to the center tap of the transformer 77c acts as a source of positive potential and is connected to the aforementioned positive bus 92 through a conductor 162. The ground line 70 is coupled by a conductor 164 to the emitter electrode 166e of a transistor 166 whose collector electrode 166c is connected to one end of a resistor 168 whose opposite end is connected to the conductor 156 constituting the negative output of the full wave rectifier circuit 150. The base electrode 166b of the transistor 166 is connected to Zener diode 170. A resistor 172 is connected from the juncture of the Zener Diode 170 and the base electrode 166b of transistor 166 and the juncture between capacitor 158 and the resistor 168 to provide a stable reference voltage for the well-known series regulator circuit formed by transistor 166.

The transformer 77 has a third secondary winding 77d one of the ends of which is coupled through a rectifier 175 to one of the plates of a filter capacitor 177 whose opposite plate is connected to the other end of the secondary winding 77d. The capacitor 177 is connected through a resistor 180 across the terminals of a Zener diode 182 which stabilizes the voltages across the aforementioned terminals U and V which feed the input to the circuit 34 forming a charge circuit for the capacitor 32.

The positive conductor 160 of the power supply is connected by a conductor 184 to the positive energizing voltage input terminal 186 of the measuring unit bridge circuit 23 which operates the aforementioned galvanometer movement 22. The other energizing input terminal of the bridge circuit 23 is at a grounded wiper 188a of a potentiometer 188. One end of the potentiometer 188 is connected through the thermocouple 11 to the positive input terminal 186 of the bridge circuit 23 and the other end of the potentiometer 188 is connected to a series circuit comprising resistors 190 and 192 and the parallel circuit comprising the resistor 194 and the potentiometer 196 leading to the positive input terminal 186. The wiper 196a of the potentiometer 196 is arranged to short circuit progressively increasing portions of the potentiometer 196 to act as a bridge adjusting or calibrating means. Potentiometers 196 and 188 are arranged coaxially and therefore adjusted simultaneously with one adjustment.

The galvanometer movement 22 is connected across the output terminals 200 and 202 of the bridge which are respectively located at the juncture between resistors 190 and 192, on the one hand, and potentiometer 188 and thermocouple 11 on the other hand. The galvanometer movement is shown connected in series with a resistor 204 in parallel with a copper metal coil temperature compensating resistor 206 and a resistor 208. Cold junction temperature is compensated by a bimetal attached to the upper hairspring of the meter movement and responsive to ambient temperature changes. Potentiometer 188 balances out thermocouple lead resistance while providing break protection in the event the thermocouple opens.

Refer now to FIG. 11 which shows the most preferred form of the invention. One of the differences in this circuit from that shown in FIG. 10 is the design of the capacitor charge circuit generally identified by reference numeral 34'. The circuit 34' is designed in such a way that an automatic offset eliminating means can be simply added thereto, as shown in FIG. 14 later to be described. Capacitor charge circuit 34' is a voltage divider circuit which provides a proportioning signal across a pair of terminals F and B.

The voltage divider circuit has voltage input terminals 211 and 213 across which a source 212 of DC voltage is connected. Terminal 211 is shown connected to the positive terminal of the voltage source 212 and terminal 213 is shown connected to the grounded negative terminal thereof. Resistors 216, 217 and 219 are respectively connected in series between the voltage input terminals 211 and 213. In the most preferred form of this invention, the middle resistor 217 is in variable resistance of relatively small magnitude in comparison to resistors 216 and 219. For example, resistor 216 may be 2,000 ohms, resistor 217 may be variable between 10 and 200 ohms and resistor 219 may be 350 ohms. (It should be understood that the specific and relative values of the resistor may be varied widely without deviating from the broader aspects of the invention). A pair of resistors 221 and 224 are connected in series across the variable resistor 217. Exemplary resistance values for resistors 221 and 224 are 221,000 ohms. The aforementioned terminal F is connected to the juncture of resistors 221 and 224 through a relatively large resistor 226, which may be, for example, 1 to 2 megohms. The terminal B may be connected to the juncture between the resistors 221 and 224 through a relatively large resistor 228 which may have a value, for example, of 0.7 megohms. A capacitor 32', which serves a similar function to the capacitor 32 in FIG. 2 is connected to the terminal B through a relatively large resistor 230, which, for example, may be 1 megohm. The capacitor 32', which may be 500 microfarads, is connected to the movable contact 28–2 of the heating or cooling signal control relay 28 through a relatively small resistor 232 which is insignificant in size relative to the aforementioned resistors 228 and 230. For example, the resistor 232 may have a value of 68,000 ohms. The movable contact 28–2 engages stationary "off" contact 28-2 ' when the relay 28 is deenergized and engages stationary "on" contact 28-2" when relay 28 is energized. The "off" contact 28-2' is connected to the upper end of the variable resistor 217 of the voltage divider network and the "on" stationary contact 28-2" is connected to the bottom end of the variable resistor 217.

FIG. 12A shows the circuit configuration of the capacitor charge circuit 34' when movable contact 28-2 engages the "on" contact 28-2" and FIG. 13A shows the circuit configuration of the capacitor charge circuit 34' when the movable contact 28-2 engages the "off" contact 28-2". It can be seen from the relative resistance values shown in FIGS. 12A and 13A that in determining the simplified charge circuits for the capacitor 32 (FIGS. 12B and 13B) when the relay 28 is respectively energized and deenergized resistors 230 and 228 can be ignored. Thus, as shown in FIG. 12B, capacitor 32' effectively charges toward the voltage E1 at the bottom of the variable resistor 217 through the relatively small resistor 232 when the relay 28 is energized and, as shown in FIG. 13B, capacitor 32' charges toward the voltage E2 at the top of the variable resistor 217 when relay 28 is deenergized. The voltage on the terminal B with respect to ground and across the resistor 228 (to the opposite ends of which terminals B and F are coupled) varies with the charge and discharge of capacitor 32'. The voltage on terminal F with respect to ground is essentially the voltage at the juncture between the resistors 221 and 224. It is apparent from FIG. 12A that during the "on" mode of operation, the capacitor 32' will be discharging from a relatively higher voltage to a lower voltage and during the "off" mode of operation the capacitor 32' will be charging from an initially lower voltage to a relatively higher voltage. The waveforms of the voltage across the capacitor 32' will be similar to that shown in FIG. 7A-C and 9A-C and the voltage on terminal B with respect to ground will vary accordingly. Thus, the voltage across the capacitor 32' will vary between two voltage levels which have a constant difference which produces the difference in signals necessary to operate the associated on-off differential signal level responsive circuit which is indicated in FIG. 11 by reference numeral 26'. The proportion of the "on" and "off" intervals of the proportional control signal will depend upon the same factors described in connection with the circuit of FIG. 10.

The control bandwidth as well as the control rate are varied by varying the magnitude of the resistor 217 since this varies the relative values of the voltages E1 and E2. Also, in this form of the invention as well as the form of the invention shown in FIG. 10 variation in the control rate can be obtained by changing the value of the resistor through which the capacitors 32' and 32 involved charge.

It is truly surprising to find that an automatic offset eliminating circuit can be obtained, as shown in FIG. 14, by the simple addition to the circuit 34' of a capacitor 32" connected between ground, a resistor 226' which is a very large resistor, such as a 2 megohm resistor, connected to the movable contact 28-2 and a resistor 236' connected to point F. The time constant afforded by the capacitor 32" and resistor 232' is extremely long relative to the time constant of the capacitor 32' and the resistor 232, so that the full effect of the capacitor 32" does not appear for a relatively long time, such as 25 minutes. (The value of capacitor 32" in one exemplary form of the invention was 220 microfarads). The voltage across the capacitor 32' is coupled to the terminal F through a relatively large resistor 230' which may be 1 megohm. It is apparent that when the capacitor 32" finally charges to the value of the capacitor 32', there will be no voltage difference between terminals B and F. Although the voltage across the capacitor 32' or terminals F and B could be added in series with the output of a solar cell circuit in a manner similar to that described in connection with the embodiment of FIG. 10, terminals F and B are preferably connected to a very unique combination bridge and chopper circuit 23' which carries out the functions of the measuring circuit 23, the solar cell circuit and the input chopper circuit 69 in the circuit of FIG. 10 using the same grounded DC voltage source 212. (Note that the bridge circuits 23 and 34 operate with a "floating ground" which reduces common mode problems). The circuit 23' has a general utility in measuring circuits generally, although it also has a particular utility in the proportional control circuit of the invention. The bridge portion of the circuit 23' in the absence of any connection to the capacitor charge circuit 34' will produce across a pair of bridge output terminals 213 and 215 a signal where the terminal 213 will be negative with respect to the terminal 215 to a decreasing degree as the set point temperature is approached. The output of the bridge portion of the circuit will be zero at the set point temperature so the voltage of terminal 213 relative to the terminal 215 will be increasingly positive for temperatures above the set point temperature.

To explain the operation of the invention, it is more convenient to follow the voltage variation between the output terminals 213 and 215 with reference to ground appearing on a ground line 217 constituting one of the energizing voltage inputs of the bridge portion of the circuit 23'. The other energizing voltage input terminal is terminal 219 connected to the source 212 of DC voltage. The bridge portion of the circuit includes a branch 23a including a resistor 231 connected between a positive bus 223 and one end of a potentiometer 235 whose opposite end is connected in series with a resistor 237 and a cold junction temperature compensating resistor 239 connected to the ground line 217. A thermocouple 11' is connected between the wiper 235a of the potentiometer 235 and the aforementioned bridge output terminal 213. The thermocouple 11' provides a progressively increasing voltage with increasing temperature, with the right-hand end thereof being positive with respect to the left-hand end so that the voltage at the bridge output terminal 213 will progressively become more positive with increase in temperature and will reach a positive voltage which will be substantially the same as the positive voltage on the bridge output terminal 215 at the set point temperature (assuming no connections are made to the capacitor charge circuit 34'). A resistor 244 is shown connected between the output terminal 213 and the positive bus 223. The resistor 244 is an extremely large resistor relative to resistor 231 and is utilized to provide continuity for the bridge output circuit should the thermocouple 11' become open circulated. For all practical purposes the resistor 244 can be ignored.

Unlike the bridge circuit 23 in FIG. 10 where the circuit operates in the millivolt range and the thermocouple resistance affects the measurement of the circuit, variations in thermocouple lead length have little effect on the circuit because of the position of the thermocouple in the circuit and the fact that the associated resistors are so much larger than the thermocouple lead length resistance.

The voltage on the bridge output terminal 213 is coupled to a filter network comprising a resistor 243 connected between the terminal 213 and the output terminal of a capacitor 234 whose opposite terminal is connected to the ground line 217. The resistor 243 and the capacitor 234 act as a noise filter for noise signals picked up by thermocouple leads. The ungrounded terminal of the capacitor 234 is coupled through a resistor 248 (which, for example, may be a 4700 ohm resistance) to the upper terminal of a capacitor 250 (which may have a value, for example, of 20 mfd.) whose opposite terminal is connected to the ground line 217. The aforementioned terminal F of the capacitor charge circuit 34' is connected to the ungrounded terminal of the capacitor 250. In effect, the voltage (or charge resulting therefrom) on the capacitor 234 and the voltage on the terminal F of the capacitor charge circuit 34' with respect to ground are mixed or effectively added in the capacitor 250. As previously indicated, in the form of the invention shown in FIG. 11, the voltage of the terminal F does not vary significantly with reference to ground.

The bridge portion of the circuit 23' has another branch 23b' extending between the DC voltage input terminals 219 and the ground line 217. This branch 23b' as illustrated includes a resistor 231' connected between the positive bus 223 and a variable resistor 233' which in turn is connected to a parallel circuit comprising a potentiometer 235' and a resistor 237'. The wiper 235a' of potentiometer 235 is connected to the bridge output terminal 215. The latter parallel connected resistors are connected in series with a resistor 239' connected in parallel with a potentiometer 241'. The latter resistors are connected through resistor 243' to the ground line 217.

A suitable temperature indicator 245 may be connected between the aforementioned bridge output terminal 213 and the wiper 241a' of the potentiometer 241'. The points in the bridge circuit to which indicator 245 are connected are not effected by the proportioning control voltage fed from the capacitor charge circuit 34'.

The other bridge output terminal 215 is connected through a resistor 248' corresponding in value to the aforementioned resistor 248 to the upper terminal of a capacitor 250' corresponding in value and function to the capacitor 250. The terminal B of the capacitor charge circuit 34' is connected to the ungrounded terminal of the capacitor 250'. Thus, the DC voltage on the bridge output terminal 215 or charge resulting therefrom is added or mixed with the voltage at the terminal B of the capacitor charge circuit 34' or the charge resulting therefrom in the capacitor 250'.

When the environmental temperature is at the lower end of the control band involved, the voltage fed to the terminal B from the capacitor charge circuit 34' will act in a direction to make the voltage of the capacitor 250' less positive with respect to the voltage across the capacitor 250 so that if one looked at the output of the bridge circuit by comparing the voltages at the ungrounded terminals of the capacitor 250' and 250 one would see a greater voltage difference than would otherwise be the case. Thus, considering the voltages across the capacitor 250 and 250' to be the output of the bridge circuit, the bridge would be balanced at a lower temperature than would otherwise be the case.

The chopper portion of the circuit 23' generally indicated by reference numeral 255 alternately and cyclically connects a capacitor 257 across the capacitors 250 and 250'. The time constant of the charge circuits for the capacitor 257 is sufficiently short that it will completely charge up to the voltage on the capacitors 250 and 250' during the time it is connected separately to these capacitors. The voltage on the capacitor 257 will, therefore, change only as the relative voltages stored in the capacitors 250 and 250' change. A conductor 259 connects the ungrounded terminal of the capacitor 257 to a DC blocking capacitor 261 which in turn feeds the input to the on-off differential signal level responsive circuit 26' whose input signal therefore is a function solely of the difference in the voltages across the capacitors 250 and 250'. This voltage difference will advantageously fluctuate in the microvolt range, such as over a range of 100 microvolts more or less in the exemplary form of the invention.

The on-off differential signal level responsive circuit 26' used with the circuit 23' being described will be assumed to be in an "off" condition when the voltage fed thereto is zero and in an "on" condition when the voltage fed thereto is, say, for example, 100 microvolts. (If desired, any suitable "off" condition offset can be provided for convenience in design of the circuit 26'.)

Junction transistors do not usually operate as effective switches at microvolt levels because transistor switches generally have too high resistance values during conduction and produce too high voltage drops to be operable in the microvolt range. Also, the voltage drop thereacross varies substantially with temperature. However, field effect transistors have been found operable with microvolt level signals. Field effect transistors act like linear resistors with such applied voltages and have a 100 to 1 impedance ratio between conducting and nonconducting conditions. For example, field effect transistors commonly have resistances in excess of 200,000 ohms in their nonconductive condition and resistances substantially under 1,000 ohms in their conductive conditions. Accordingly, as shown in FIG. 11, the ungrounded end of the capacitor 257 is connected to the drain electrodes D and D' of a pair of field effect transistors 263 and 263'. The source electrodes S and S' of the field effect transistors 263 and 263' are connected to the ungrounded terminals of capacitors 250 and 250'. In the circuit being described, the resistors 265 and 265' may be, for example, 3300 ohms. The gate electrodes G and G' of the field effect transistors 263 and 263' are respectively connected through resistors 265 and 265' to signal input leads 267 and 267' which receive clipped half-wave rectified negative pulses P7' derived from the secondary winding 270a of transformer 270 whose primary winding 270b is connected to a suitable source 271 of 60 cycle AC voltage. The opposite ends of the secondary winding 270a are connected respectively through rectifiers 272 and 272' and resistors 274 and 274' to the signal input leads 267 and 267' respectively. Zener diodes 277 and 277' connected between the terminals 267 and 267' and the ground line 217 act as clippers which clip the half-wave rectified voltage at steep points in the voltage waveforms involved so that negative pulses appearing as square waves are fed to the terminal 267 and 267'. Resistors 279 and 279' are connected in parallel with the Zener diodes 277 and 277'. The negative voltage appearing on the leads 267 and 267' during alternate half cycles of the 60 cycle waveform of the AC voltage source 272 alternately drive the field effect transistors to a high resistance condition so that during the intervening half cycles the field effect transistors conduct to couple the capacitor 257 alternately through the resistors 265 and 265' to the capacitors 250 and 250'.

The combination bridge and chopper circuit 23' requires only a single power supply operating with a grounded input which reduces the cost, eliminates or minimizes noise and common mode problems and increases the reliability of the circuit.

The on-off differential signal level responsive circuit 26' operates similarly to the circuit 26 previously described and therefore a disclosure of the circuit 26' has not been made. It is apparent, however, that the input of the circuit 26' omits the chopper circuit 69 previously disclosed in the circuit 26. Also, the end of the feedback circuit used in the circuit 26 to feed a DC back to the input capacitor 67 of the chopper circuit 69 is shown in FIG. 11 by a conductor 280 leading to capacitor 250'.

In order to understand the theory of the automatic reset circuit shown in FIG. 14 let us approach it from the most simplified type of control and then onward in increasing complexity. FIG. 15a shows a simple on-off control system with a defined 2° differential (set point 200°, "on" at 199° and "off" at 201°). FIG. 15b represents a proportioning or anticipatory control system as shown in FIGS. 10 or 11. As capacitor 32 or 32' charges up, the resultant voltage would move the "off" point down to 180° within, for example, 25 seconds after "turn on" and before the process temperature reaches the set point. As the process temperature would approach 182°, the controller would turn off. The already described proportioning would then take place as a result of the voltage gradient involved. At some point there will be a harmonious relationship between the pulses to the load and the sensor input information at which neither yields any new error. In that case, the process temperature will settle out somewhere within the control band (depending on process needs). Unless the process required a 50 percent heat input, the true ultimate temperature could be anything but the set point within the control band of from 180° to 220° F. If a greater percentage of heat than 50 percent were required, the ultimate temperature would be less than 200° F. and, conversely, if a lesser percentage of heat were required the ultimate temperature would be between 200° and 220° F. If this temperature would be at some discrete point and external factors (line, load, inertia, mass, etc.) change, a new offset temperature would be established. This means that even if the set point were manually changed to allow the final temperature to be 200° F., changes in external factors could move this around over a period which may be intolerable.

Refer now to FIG. 15c which illustrates operation of the automatic reset circuit of FIG. 14 where the process temperature has not yet arrived near the control band. For the first, for example, 25 seconds or so after "turn on," the "off" point is moved down to 182° F. During the next, for example, 25 minutes, capacitor 32″ charges to a voltage which is roughly the same as that to which capacitor 32′ charges which voltage is applied to point F by the chopper circuit in opposition to the voltage applied to point B so the off point will move gradually back to 201° (or that point where it would be as a simple on-off controller). It can be seen then that over a large period the average voltage value of the capacitors 32′ and 32″ are the same. Without automatic reset the system would provide an offset, for example, to 190° F. With automatic reset it might momentarily control there, but capacitor 32″ would gradually charge to the average capacitor 32′. Since capacitor 32″ will eventually charge to the average value of the voltage across capacitor 32′ the control voltage fed to the circuit 26′ ultimately be nearly zero meaning that, except for instantaneous values appearing across capacitor 32′ causing proportioning action, the control will be at the set point. During this longer reset period (due to capacitor 32″) instantaneous on-off pulses providing proportioning will not have changed materially. For this example we can assume that the load wants to be "on" 75 percent of the time and "off" 25 percent of the time. It follows in usual processes that this ratio will not change much over a ±10 percent change in control temperature.

Now referring to FIG. 15d, let us assume that the process involved now requires a 20 percent "on" time to effect straight line control. As shown in FIG. 15d, some 25 or so minutes after "turn on", the control system will begin to "turn off" first around 200° F. Since this process requires only a 20 percent on time for proper control in this temperature area the actual process temperature will for the moment somewhere near 240° (let's say 235° F.). At this point capacitor 32″ will begin its long time constant charge to approach the average voltage which is across capacitor 32′, the actual process temperature begins to move downscale at an exponential rate. At the time that the capacitors 32′ and 32″ have the same average charge, the instantaneous waveform of the voltage on capacitor 32′ will effect a 20 percent "on" time, but the average voltages from both capacitors will be cancelled out as explained previously. FIG. 15e shows the final result of the automatic reset current.

It is understood that more modifications may be made in the most preferred forms of the invention described previously without deviating from the broader aspects of the invention.

We claim:

1. A proportional temperature control apparatus for generating at an output heating or cooling producing signals to be cyclically intermittently applied over a range of temperatures so the proportion of each cycle a heating or cooling producing signal is present is a maximum at one end of said temperature range and progressively decreases to a minimum near zero at the other end of the temperature range, said apparatus comprising: manually operable temperature set point means for selecting the midpoint of the range of temperatures over which the proportional temperature control is to take place, temperature measuring means responsive to the temperature of the environment to be heated or cooled, a control circuit responsive to said manually operable temperature set point means and said temperature measuring means for generating said cyclically applied signals at said output within the selected temperature range, said control circuit including bandwidth and rate control means for simultaneously adjusting both the number of degrees included within said range of temperatures over which the proportional control is effected, and the rate at which said heating or cooling signals are cyclically applied to said output at corresponding points within the selected range of temperatures increasing with the number of degrees within the temperatures range over which proportional control is effected.

2. In proportional temperature control apparatus including an output at which heating or cooling producing signals are to be cyclically applied so the proportion of each cycle a heating or cooling producing signal is present is a maximum at one end of said temperature range and progressively decreases to a minimum near zero at the other end of the temperature range, manually operable temperature set point means for selecting the midpoint of the range of temperatures over which the proportional temperature control is to take place, and temperature measuring means responsive to the temperature of the environment to be heated or cooled, the improvement comprising: a differential input signal responsive circuit which generates a heating or cooling producing signal at the output of said apparatus when an input signal fed thereto reaches a first level and continues to generate said heating or cooling producing signal at said output until said input signal reverses direction and reaches a second signal level, whereupon said heating and cooling producing signal disappears until the resultant input signal again reaches said first level; first voltage generating means responsive to said temperature measuring means and said manually operable temperature set point means for providing a first input voltage component which progressively varies between first and second voltage levels as the temperature of said environment varies between the limits of said temperature range over which proportional control is to be effected; second voltage generating means which provides a second input voltage component which is mixed or added to said first input voltage component; signal feeding means for feeding a signal to said input of said differential input signal responsive circuit which is a function of the added or mixed voltage components; said second voltage generating means including a capacitor across which said second input voltage component is developed, and a charge circuit for the capacitor including means for selectively providing first and second DC capacitor charging voltages having values spaced apart a number of voltage units substantially greater than the variation of said second voltage input component, and means responsive to the presence of heating or cooling signals in the output of said temperature control apparatus for causing the capacitor to charge toward one of said DC voltages to bring the voltage across the capacitor to a value which provides a resultant signal at said second level at the input of said differential input signal responsive circuit which causes the heating or cooling signals to disappear from said output, and responsive to the absence of heating or cooling signals in the output of said temperature control apparatus for causing the capacitor to charge toward the other of said DC voltages to bring the voltage across the capacitor to a value which provides a resultant signal at first level at the input of said differential input signal responsive circuit to reestablish said heating or cooling signals at the output of said temperature control apparatus.

3. The proportional temperature control apparatus of claim 2 wherein the time constant of said capacitor charge circuit over the various temperatures involved within said temperature range remains substantially constant.

4. The proportional temperature control apparatus of claim 2 wherein said voltage charge circuit of said second voltage generating means including means for selectively varying the value of at least one of said first and second DC capacitor charging voltages.

5. The proportional temperature control apparatus of claim 2 wherein said means responsive to the presence or absence of the heating or cooling signals in the output of the apparatus includes a bridge circuit having opposite branches connected across a pair of voltage energizing input terminals, the capacitor and a charging resistance being connected across intermediate points of said branches constituting output terminals of the bridge circuit, and means for selectively varying the points of connection of said capacitor and charging resistance to at least one of said branches in accordance with the presence and absence of the heating or cooling signals in the output of said apparatus to provide said first and said second capacitor charging voltages.

6. The proportional control apparatus of claim 5 wherein one of said branches has a potentiometer with a wiper constituting one of said points of connection of said capacitor and charging resistance and the other point of connection thereof in said one branch being a point other than the potentiometer, wherein the variation of the position of the wiper on the potentiometer will progressively vary the magnitude of one of said capacitors charging voltages.

7. The proportional control apparatus of claim 2 wherein said means responsive to the presence and absence of the heating or cooling signals in the output of the apparatus includes a voltage divider circuit having at least three series connected resistor means extending between a pair of DC energizing voltage input terminals, said capacitor having one plate coupled to a point in the voltage divider circuit remote from adjacent ones of said resistor means, and switch means respectively coupling the other plate of said capacitor through a charging resistor means to the remote ends of said adjacent resistor means when the heating or cooling signals are respectively present and absent in the output of the proportional control apparatus.

8. The proportional temperature control apparatus of claim 7 wherein said one plate of said capacitor is coupled to the juncture of said adjacent resistor means through at least two series connected coupling resistor means of very high value relative to said capacitor charging resistor means so the latter is insignificant relative thereto, and said means for feeding a signal to said differential input signal responsive circuit including means responsive to the voltage across the one of said series connected coupling resistor means remote from said one plate of said capacitor.

9. The proportional temperature control apparatus of claim 8 provided with automatic offset eliminating means comprising a second capacitor and a second charging resistor means connected in series across the first-mentioned capacitor and its charging resistor means, the time constant of the second capacitor and its charging resistor means being extremely long relative to the time constant of the first-mentioned capacitor and its charging resistor means, and means for coupling the voltage across said second capacitor to the terminal of said one coupling resistor means remote from said first-mentioned capacitor, whereby ultimately the voltage across said one coupling resistor means drops substantially to zero.

10. The proportional temperature control apparatus of claim 8 wherein said first voltage generating means comprises a DC bridge circuit having a pair of DC voltage input terminals and a pair of resistance-containing branches extending between said voltage input terminals, there being associated with at least one of said branches variable responsive means which produces a variation in the voltage between a point associated with said one branch constituting an output terminal of the bridge circuit and a point in common between said branches, said manually operable temperature set point means including means for varying the point of connection of a second output terminal for the bridge to said other branch; second and third capacitors respectively coupled between said bridge output terminals and said common point; and said means for feeding a signal to the input of said differential input signal responsive circuit includes means for coupling the output across said one coupling resistor means of said voltage divider circuit respectively across the terminals of said second and third capacitors remote from said common point, said voltage divider and bridge circuits sharing a common DC voltage source, a fourth capacitor having one plate connected to said common point, switch means for connecting the other plate of said fourth capacitor alternately and cyclically to the plate of said second and third capacitors remote from said common point, and means for coupling the output of said fourth capacitor to the input of said differential input responsive circuit.

11. The proportional temperature control apparatus of claim 2 wherein said differential level signal output circuit responds to a chopped signal so said signal levels represent the envelope of the chopped signals, said first voltage generating means comprises a DC bridge circuit having a pair of DC voltage input terminals and a pair of resistance-containing branches extending between said voltage input terminals, there being associated with one of said branches said temperature measuring means which produces a variation in the voltage with temperature between a point associated with said one branch constituting an output terminal of the bridge circuit and a point in common between said branches, said manually operable temperature set point means including means for varying the point of connection of a second output terminal for the bridge to said other branch; second and third capacitors respectively coupled between said bridge output terminals and said common point; and said means for feeding a signal to the input of said differential input signal responsive circuit includes means for coupling a voltage following that across said first mentioned capacitor across the terminals of said second and third capacitors remote from said common point, a fourth capacitor having one plate connected to said common point, switch means for connecting the other plate of said fourth capacitor alternately and cyclically to the plate of said second and third capacitors remote from said common point, and means for coupling the output of said fourth capacitor to the input of said differential input responsive circuit.

12. The proportional temperature control apparatus of claim 2 wherein there is provided offset eliminating means comprising means for progressively reducing said second input voltage component to zero over a prolonged period.

13. In proportional temperature control apparatus including an output at which heating or cooling producing signals are to be cyclically applied so the proportion of each cycle a heating or cooling producing signal is present is a maximum at one end of said temperature range and progressively decreases to a minimum near zero at the other end of the temperature range, manually operable temperature set point means for selecting the midpoint of the range of temperatures over which the proportional temperature control is to take place, and temperature measuring means responsive to the temperature of the environment to be heated or cooled, the improvement comprising: a differential input signal responsive circuit which generates a heating or cooling producing output signal when a resultant input voltage $Er$ reaches a first level $V1$ and continues to generate a heating or cooling producing output signal until $Er$ changes direction and reaches a second voltage level $V2$, whereupon said heating or cooling producing signal disappears until $Er$ again reaches $V1$; first signal input generating means responsive to said temperature measuring means and said manually operable temperature set point means for providing a first input voltage component $ei$ which progressively varies between a third and fourth level $Vp1$ and $Vp2$ as the temperature of said environment varies between the limits of said temperature range over which proportional control is effected; and second voltage input generating means which provides a second input voltage component $ei'$ coupled in additive relationship with said first input voltage component $ei$ to the input of said differential input voltage responsive section, said second voltage input generating means including a capacitor across which said second input voltage component $ei$ is generated, when the temperature of said environment is at one end of said temperature range the variation in the capacitor voltage to make $Er$ vary between $V1$ and $V2$ being $Vc1$ and $Vc1'$ respectively to initiate and terminate said heating or cooling input signal, and when the temperature of said environment is at the other end of said temperature range the variation in capacitor voltage to make $Er$ vary between $V1$ and $V2$ being $Vc2$ and $Vc2'$ respectively to initiate and terminate said heating or cooling output signal, means responsive to the presence of a heating or cooling signal in the output of the apparatus for applying to said capacitor through a charging resistance a voltage $V3$ which is at or near the value $Vc1'$ so it will take a relatively long time for the charge on the capacitor to reach the value $V_{c1}'$ relative to the time it takes to reach the value $V_{c1}$ when the temperature of the environment is at or near one end of said temperature range, and means responsive to the absence of a heating or cooling signal in the output of the apparatus for applying to said capacitor through a charging resistance a voltage V4 which is at or near the value $V_{c2}$ so it will take a relatively long time for the charge on the capacitor to reach the value $V_{c2}$ relative to the time it takes to reach the value $V_{c2}'$ when the temperature of the environment is at or near the other end of said temperature range.

14. The proportional temperature control apparatus of claim 13 wherein the number of voltage units between said voltage levels V1 and V2 is a fraction of the number of voltage units between the voltages V3 and V4.

15. The proportional temperature control apparatus of claim 13 wherein said charging resistance for the capacitor remains substantially constant.

16. The proportional temperature control apparatus of claim 13 wherein there is provided means for selectively varying at least one of the voltages V3 and V4 effectively simultaneously to vary the number of degrees in said temperature range over which proportional control is effected and the period between the successive or cyclic appearance of the heating or cooling signals at the output of said apparatus, said period increasing with the reduction in the number of degrees in said temperature range for any given relative position within the range.

17. The proportional temperature control apparatus of claim 13 wherein said means responsive to the presence and absence of the heating or cooling signals in the output of the apparatus including a bridge circuit with the capacitor and said charging resistance being connected across the output of the bridge circuit, and means for varying the relative values of the resistances in at least two arms of the bridge circuit in accordance with the presence and absence of the heating or cooling signals in the output of said apparatus to produce said voltages V3 and V4.

18. The proportional temperature control apparatus of claim 2 wherein said differential level signal output circuit responds to a chopped signal so said signal levels represent the envelope of the chopped signals, said first voltage generating means includes a bridge having a pair of energizing voltage input terminals and a pair of resistance containing branches extending between said energizing voltage input terminals, there being associated with at least one of said branches said temperature measuring means which produces a variation in the voltage between a point associated with said one branch and constituting an output terminal of the bridge circuit and a point in common with said branches, said manually operable set point means being associated with the other of said branches to produce a variation in the voltage between a point associated with the other branch and constituting another output terminal of the bridge circuit and said common point, and a bridge output circuit connected between said bridge output terminals which includes the voltage output of said second voltage generating means applied between a voltage addition point in said output circuit and said common point so a voltage is provided at the voltage addition point which is a function of the sum of the voltage at one of said bridge output terminals and the output of said second voltage generating means, and said bridge output circuit including a chopper circuit comprising a pair of switch means in series between said voltage addition point and the other bridge output terminal, a capacitor coupled between the juncture of said switch means and said common point, and means for alternately rendering said switch means conductive and nonconductive at the desired chopping rate for alternately coupling said capacitor between said output terminals of the bridge circuit, the time constant of the circuit including said capacitor being such that the capacitor charges to the applied voltage during the conduction period of the associated switch means, and means for coupling the voltage variations on said capacitor to the input of said differential level signal output circuit.

19. The bridge circuit of claim 18 wherein said switch means are a pair of field effect transistors with the corresponding load terminals thereof respectively connected between said capacitor and said voltage addition point and the latter said other bridge input terminal, said means for rendering said switch means alternately conductive including means for feeding signals to the gate terminals of said field effect transistors for alternately rendering the same conductive and nonconductive.